Figure 1:
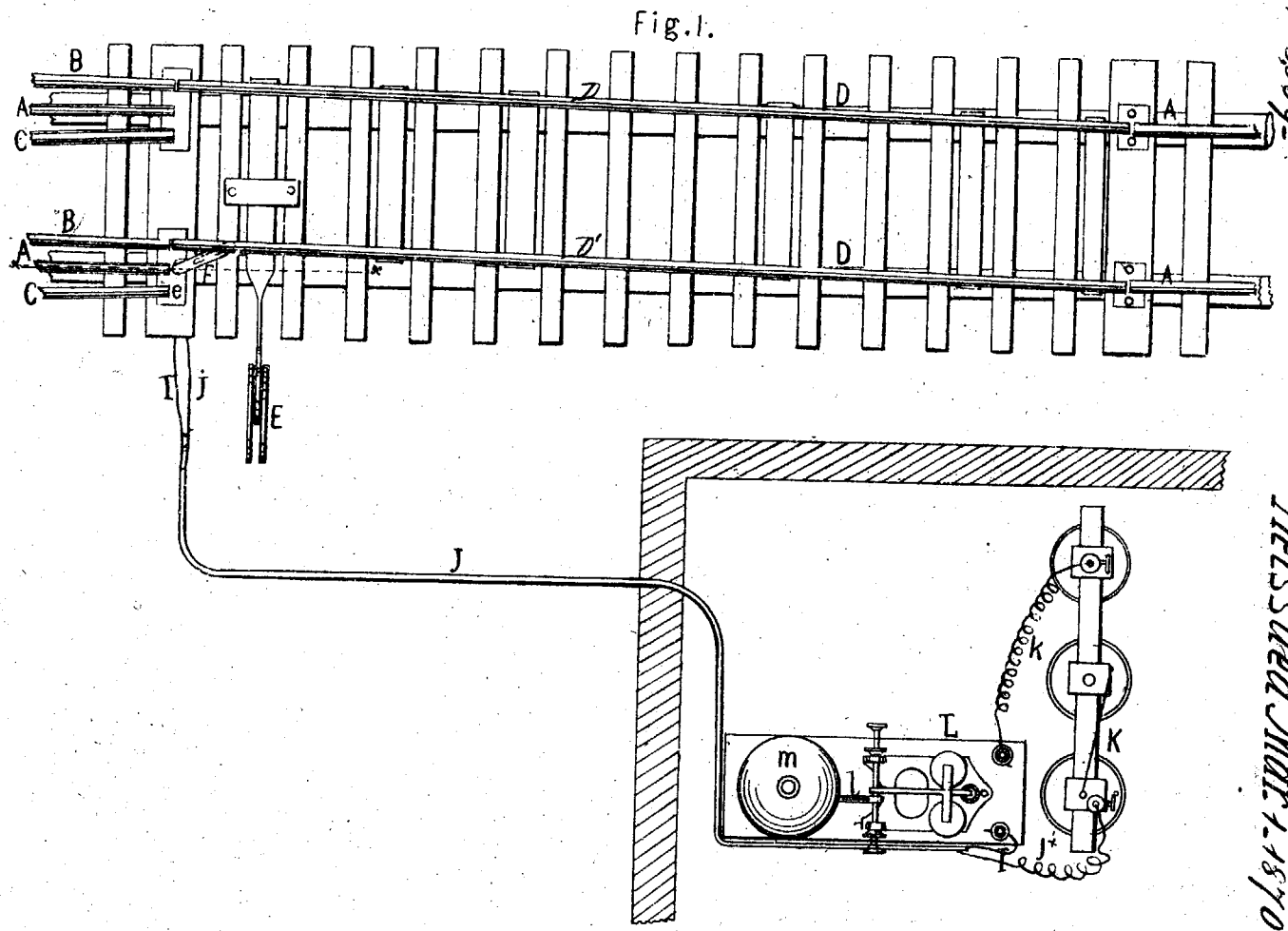

2. Sheets.
Sheet 1.

T. S. Hall.
R. R. Switch Alarm.

No 3859.

Reissued Mar. 1. 1870.

Witnesses:
Wm. F. McNamara
E. F. Calcan

Inventor:
Thomas S. Hall

2 Sheets
Sheet 2.
T. S. Hall.
R. R. Switch Alarm.
No 3859.
Reissued Mar. 1. 1870.
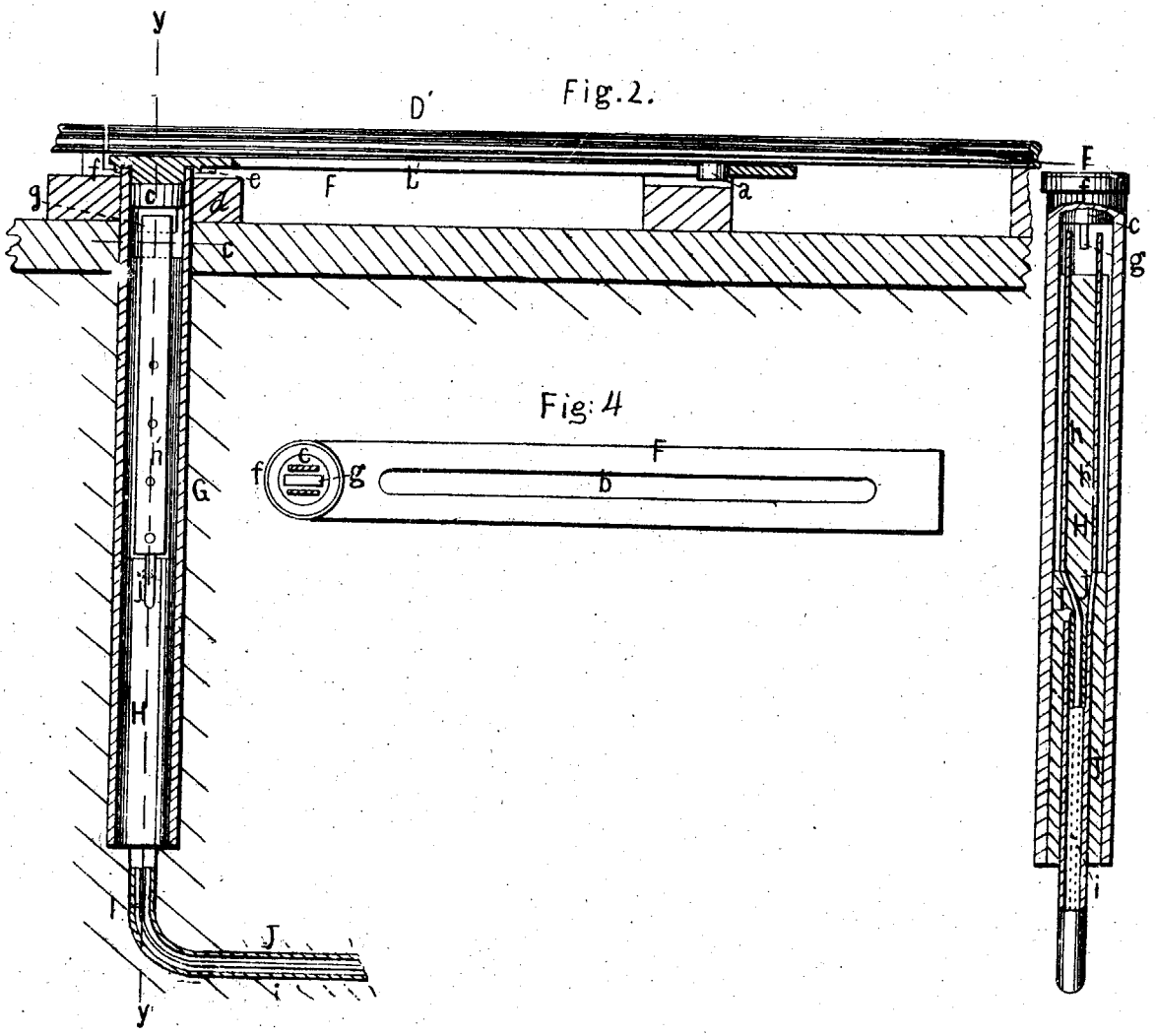
Witnesses.
Wm. F. McNamara
E. A. Fallan
Inventor.
Thomas S. Hall

United States Patent Office.

HALL'S PATENT ELECTRIC RAILWAY-SWITCH AND DRAWBRIDGE-SIGNAL COMPANY OF NEW HAVEN CONNECTICUT, ASSIGNEES OF THOMAS S. HALL.

*Letters Patent No.* 62,414, *dated February* 26, 1867; *reissue No.* 3,859, *dated March* 1, 1870.

IMPROVEMENT IN ELECTRO-MAGNETIC ALARMS FOR RAILROAD SWITCHES.

The Schedule referred to in these Letters Patent and making part of the same

*To all whom it may concern:*

Be it known that THOMAS S. HALL, of Stamford, in the county of Fairfield, and State of Connecticut, did invent a new and improved Alarm or Indicating-Attachment for Railroad Switches; and we do hereby declare that the following is a full, clear, and exact description thereof, which will enable others skilled in the art to make and use the same, reference being had to the accompanying drawings forming part of this specification.

This invention relates to a new and improved alarm or indicating-attachment for railroad switches and rails, whereby an engineer, station-master, or other employé on a train, or at a station-house, will be at all times cognizant of the position of the switch or rail, so that in case a switch-tender should fail in his duty, and not properly adjust a switch and while a switch or bridge is open, the station-master, or other employé, will be made aware of the fact, and have the switch adjusted in proper position, or stop the train before an accident can occur.

The invention consists in having an electro-magnet applied to the switch or rail, in such a manner that, when the switch or rail is not in line with the main track, a signal will be displayed, or a continuous alarm sounded; and hence, if a switch-tender, after adjusting the switch in line with a branch track to accommodate a train, should fail, after the passing of such train, to readjust the switch in line with the main track, the signal or continuous alarm would arrest the attention of the station-master or other employé, who would have the switch properly adjusted at once, and when a train should approach an open switch, the engineer will be forewarned in time to prevent an accident.

In the accompanying drawings—

Figure 1, Sheet No. 1, is a plan or top view of my invention.

Figure 2, Sheet No. 2, an enlarged vertical section of a portion of the same taken in the line *x x*, fig. 1.

Figure 3, a vertical section of fig. 2 taken in the line *y y*.

Figure 4, a detached inverted plan of a part pertaining to the invention.

Similar letters of reference indicate corresponding parts.

A A represent the rails of the main track of a railroad;

B B C C the rails of two branch tracks; and

D D′ the rails of a switch, so arranged as to be capable of being adjusted in line with the main or either of the branch tracks.

These parts being arranged in the usual way, and common to all railroads, do not require a minute description.

The switch is moved by means of a hand-lever, E, as usual, or by suitable apparatus.

To one of the rails D′ of the switch, near its free or disengaged end, a slotted plate, F, is connected, a pendent pin, *a*, from said rail extending down through an oblong slot, *b*, in said plate, (see figs. 2 and 4.)

One end of this plate F is provided with a cylindrical pendent hub, *c*, which is fitted in the upper end of a metal cylinder, G, the latter extending down into the earth, and its upper end passing through the sleeper *e* and tie *d*, and also through the metal chain, on which the free or disengaged end of the switch-rail D′ works.

The plate F is provided with an annular flange, *f*, to fit snugly around the upper end of the cylinder G, and prevent the entrance of moisture into the same.

The hub *c* is allowed to turn freely in the upper end of G, and said hub has a thin projection, *g*, extending down centrally from it, and having parallel sides, (see figs. 2, 3, and 4.)

Within the cylinder G there is fitted a cylinder, H, to which there are secured two metal plates, *h h′*, at opposite sides, and at its upper part.

These metal plates *h h′* are let in the cylinder H, so that they will be free from the cylinder G, and said plates extend upward a short distance above the top of the wooden cylinder H, as shown clearly in figs. 2 and 3, the projection *g* extending down between the upper parts of the plates *h h′*.

The lower end of the plate *h* has a copper wire, I, attached to it, and this wire is covered with any suitable insulating material, *i*, and is inclosed within a tube, J, of lead or other conducting material, (see figs. 2 and 3.)

The tube J extends up within the wooden cylinder H, and is connected by a wire, *j*, with the plate *h′*.

The tube J, with its inclosed insulated copper wire I, extends under the surface of the ground to the station-house, and the tube J is connected, by a wire, *j*×, with one of the poles of the battery K, while the other pole is connected by a wire, *k*, with an electro-magnet, *l*, with which the copper wire I is also connected, as shown in fig. 1.

The electro-magnet *l* may be connected in any proper manner to give an alarm or display a signal, when the circuit passes through it, or to do so when the circuit is broken.

A hammer, L, for instance, may be made to act against a bell, *m*.

When the switch is in line with the main track, the circuit will be broken, as the plate F, which is connected to rail D′ of the switch, is not in contact with the plates *h h′*, the projection *g* of the hub *c* being parallel with and free from said plates, as shown in fig. 3; but when the switch is adjusted in line with either of the branch tracks B B or C C, the ends of the projection *g* will be in contact with the plates *h h'*, and the circuit will be completed, and the alarm sounded so long as the switch is allowed to remain thus adjusted.

Hence it will be seen that, in the event of a switchman adjusting the switch in line with a branch track to accommodate a train which is to pass thereon, and failing to readjust the switch in line with the main track after such train has passed, the prolonged alarm will arrest the attention of the station-master, who will see that the switch be properly readjusted in line with the main track.

It will also be seen that any kind of visible or audible signal may by any such means, that is, by means of electro-magnetism, be operated, either by the closing or opening of the circuit.

We do not confine ourselves to the apparatus here described.

Having thus described the invention,

What is claimed as new and desired to be secured by Letters Patent—

1. The method, above described, of creating a continuous alarm at a railroad-station until a switch, out of its place, has been readjusted.

2. The combination, with the switch or movable rail, of the slotted lever F, swivel-head C, plate *g*, and the metallic connections *h h'*, for operating an electric signal or alarm apparatus.

WM. A. CUMMINGS, *President.*

Witnesses: R. E. RICE, *Secretary.*

S. S. BUSHNELL,

BENJ. F. SACKETT.